Feb. 9, 1965    R. N. QUENNEVILLE    3,168,892
STARTER CONTROL MECHANISM
Filed July 28, 1961    3 Sheets-Sheet 1

INVENTOR
RAYMOND N. QUENNEVILLE
BY Norman Friedland
AGENT

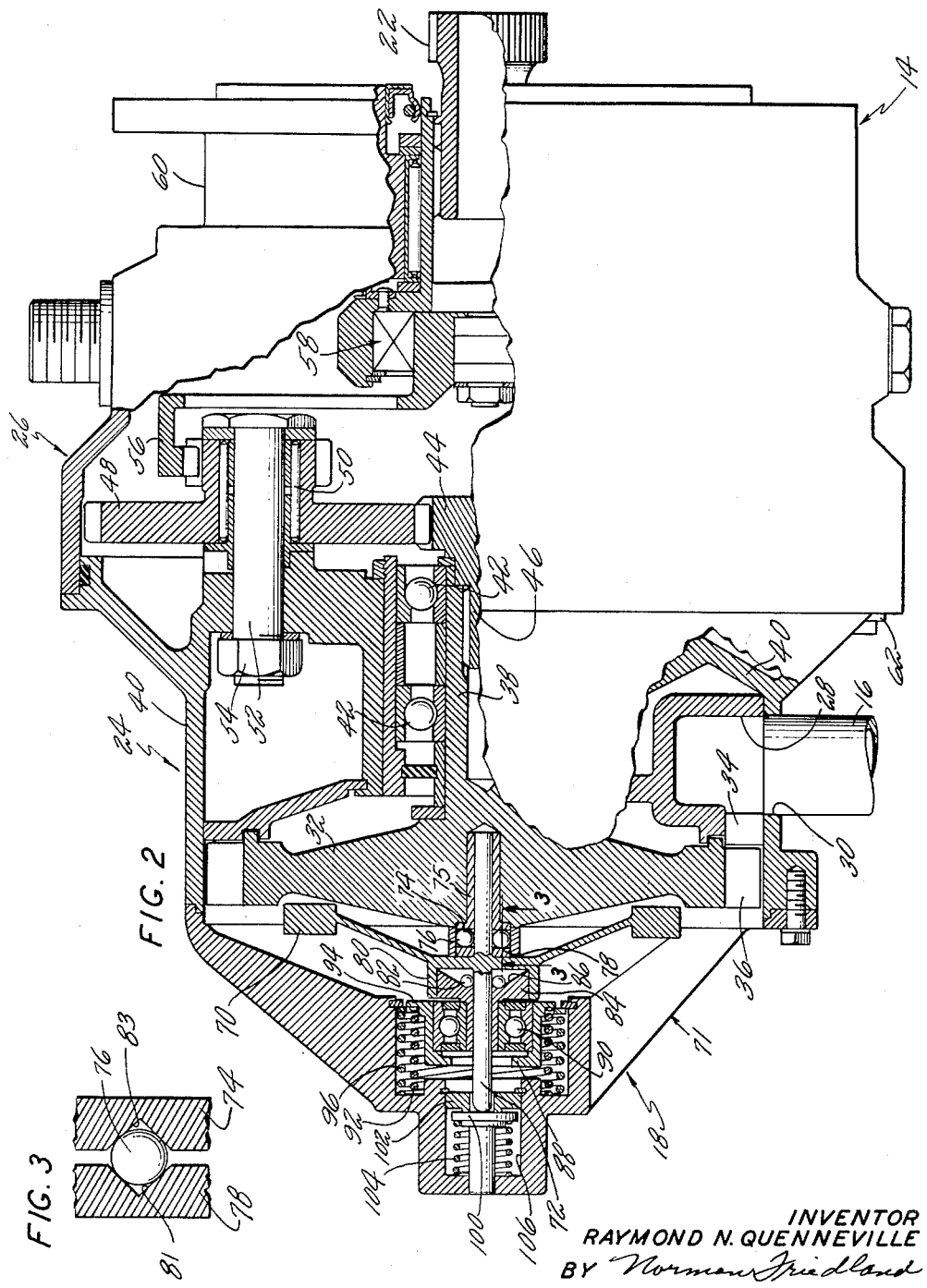

3,168,892
STARTER CONTROL MECHANISM
Raymond N. Quenneville, Granby, Conn., assignor to United Aircraft Corporation, East Hartford, Conn., a corporation of Delaware
Filed July 28, 1961, Ser. No. 127,693
8 Claims. (Cl. 123—179)

This invention relates to starters and more particularly to the starter control mechanism.

An object of this invention is to control the torque output of a starter.

A further object of this invention is mechanism which will control the acceleration of the output shaft wherein said acceleration is programmed as a function of the speed of the turbine.

A still further object of this invention is to provide mechanism in a device as described which will override the normal pressure control so that the torque of the starter is regulated by virtue of programming the acceleration of the starter as a function of its speed.

It still is a further object to provide in a device, as described, an accelerometer and a cooperating speed responsive mechanism which are operatively connected to a servo device for programming the acceleration of the turbine.

It still is a further object to provide mechanism of the type, as described, so that a desired acceleration rate is obtained regardless of the torque characteristics of the power plant being started by said starter.

Other features and advantages will be apparent from the specification and claims and from the accompanying drawings which illustrate an embodiment of the invention.

FIG. 2 is a longitudinal section of the starter showing the acceleration programming mechanism.

FIG. 3 is an enlarged sectional view showing the cam surface of the acceleration sensing mechanism.

Figure 5:
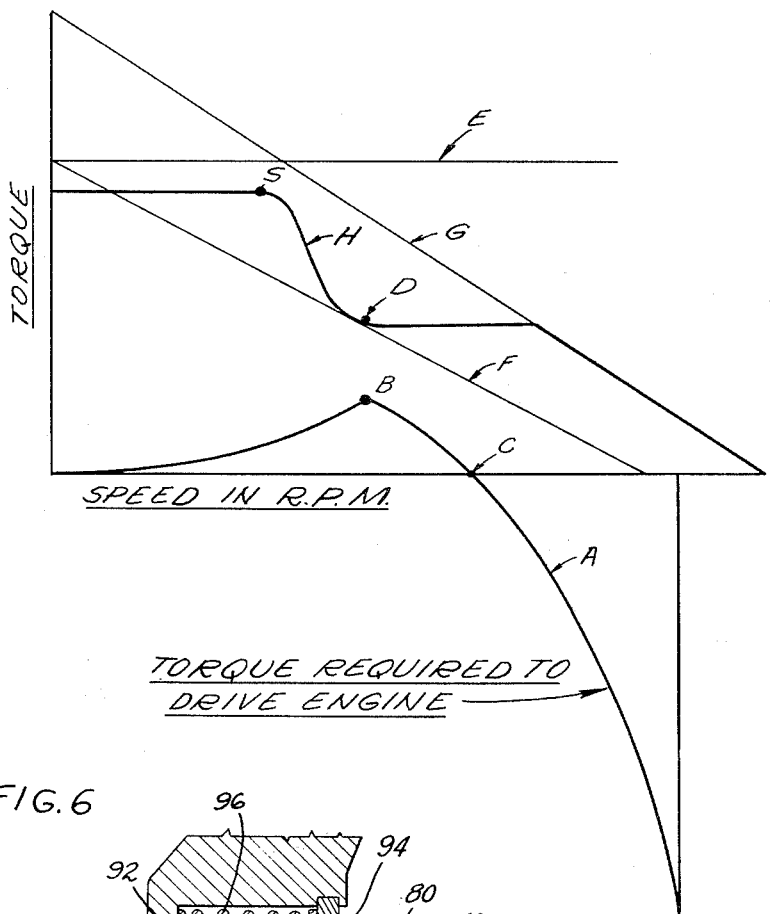
FIG. 5 is a graphical illustration of torque and speed characteristics of an engine and starter.

Since the torque of a rotating mass equals the inertia of the mass multiplied by its acceleration, I have found that I can control the torque and speed characteristics of a starter so that the torque may be regulated by programming the acceleration as a function of speed. FIG. 5 is a graphical illustration of starter torque vs. speed and engine torque vs. speed. Curved A represents a typical curve of torque required to drive an engine plotted against engine speed. Point B is the point where engine ignition occurs. At this point the engine begins to aid the starter in overcoming the engine drag forces. Point C indicates the speed at which the engine becomes self-sustaining. The engine after ignition commences to produce torque in the same direction as the starter and thus the starter torque is no longer necessary to maintain engine speed.

In some engines it is necessary to limit starter torque at the point where ignition occurs. Point D indicates a starter output torque that will insure that the engine acceleration at the point of ignition will be limited to a value that will permit proper starting. However, as illustrated by FIG. 5, there is a maximum allowable torque which must not be exceeded in order to prevent exceeding the structural integrity of the rotating mechanism so that the maximum torque produced by the starter must not exceed that torque indicated by lines E. These two requirements limit the starter torque curve to that indicated by line F for conventional axial turbine starter designs. It will be noted that a starter designed to operate along the slope represented by curve F results in an exceedingly long start cycle.

I have found that a starter may achieve the proper operation characteristics by providing means for utilizing the basic torque curve as indicated by line G and programming the resulting engine acceleration as a function of engine speed to obtain results illustrated by curve H. Thus it becomes apparent that a starter designed to function in the manner represented by curve H will satisfy both the maximum engine torque and the acceleration requirements at the time when ignition of the engine occurs. Owing to the fact that the acceleration is controlled in the manner described above, the time necessary to achieve the starting (i.e., ignition of the engine) has been greatly reduced.

Figure 1:
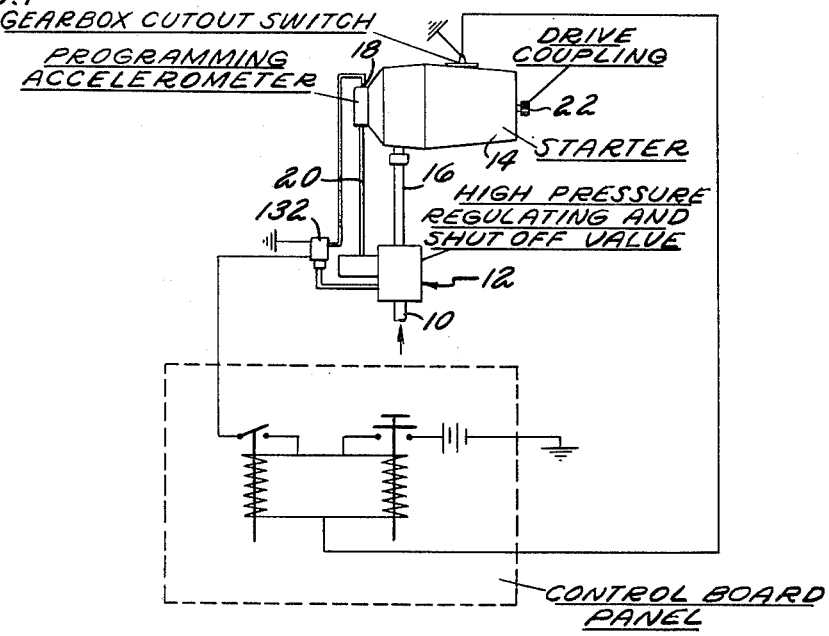
FIG. 1 is a schematic illustration of a starter showing its various connections.

As is shown in FIG. 1, the motivating fluid, which is supplied by the pressurized fluid source, is introduced into pipe 10 and is metered by virtue of the pressure regulating and shutoff valve 12 and supplied to the starter 14 by pipe 16. The program accelerometer 18, which is affixed to the starting mechanism, is connected to the pressure regulating and shutoff valve, via the fluid conducting passage 20. In this manner the program accelerometer 18 connects to the controlling mechanism of the pressure regulating and shutoff valve to override the normal regulating mechanism which, in turn, causes limitation of the torque output of the drive coupling 22. The drive coupling is connected to the power plant (not shown) for causing starting thereof.

The starter, as shown in FIG. 2 is considered to be the preferred embodiment comprising a power section indicated generally at 24, a gear reduction section indicated generally at 26, and a drive coupling 22 for driving the engine. The power section includes volute 28 which has an opening 30 adapted to receive the pipe line 16. The motivating fluid which propels the turbine rotor 32 is directed through the nozzles 34 to impinge on the turbine buckets 36 causing rotation of the turbine rotor. The turbine rotor 32 carries a rearwardly extending shaft 38 which is supported to the outer casing 40 by bearings 42. A pinion gear 44 carried on shaft 46 is splined to the inner diameter of shaft 38. A plurality of compound idler gears 48 (only one is shown for convenience) are supported by needle bearing 50 to the stub shaft 52. Stub shaft 52 is secured to the casing 40 by nut 54. An internal ring gear 56 engages the compound idler gear and is rotated thereby for transmitting torque to the drive coupling 22. A sprag clutch 58 is interposed between the internal ring gear and the drive coupling 22 permitting the drive coupling to drive in only one direction. Thus rotation of the turbine will drive the drive coupling 22 through the gear reduction section and through the clutch mechanism 58. Casing 60 surrounding the gear reduction section is secured to casing 40 by the securing member 62.

Figure 6:
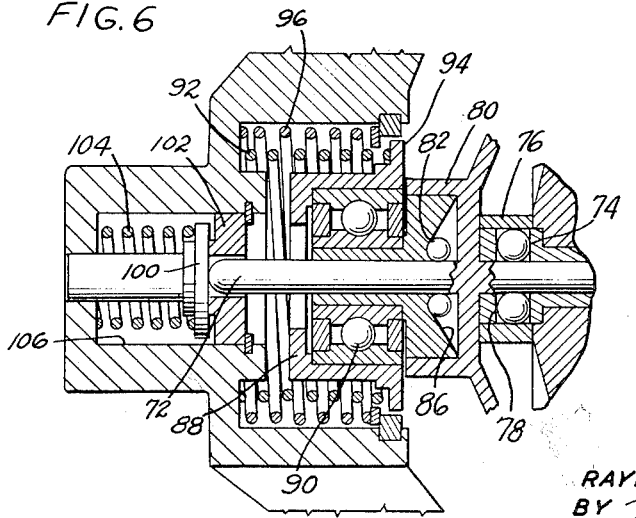
FIG. 6 is an exploded sectional view illustrating the details of the actuating mechanism of FIG. 2.

The accelerating limiting device generally indicated by numeral 18 is mounted in the turbine discharge section 71 of the starter and comprises a flywheel 70 which is carried by shaft 72. As best seen in FIG. 6 the right end of the shaft 72 is inserted into the turbine rotor and is coaxially mounted therewith but is free to rotate so that the shaft 72 can move in a rectilinear direction. A sleeve 75 surrounding the end portion of shaft 72 carries a flange member 74 which terminates at the end of the turbine rotor. A pair of balls 76 are disposed between the flange and the cam member 78 so that the opposing diametrical end surface of the ball engages both the flange 74 and the cam 78.

As is shown in FIG. 3, both flange 74 and cam 78 have cut therein V grooves 81 and 83 which receive the ball member 76. Cam 78 is affixed to the rear surface of the flyweight 70 so that both members will rotate together. Thus, it is apparent that the inner sleeve, which is secured and rotatable with the turbine rotor, transmits torque to the cam member 78 through the balls 76. The shaft 72 carries a cup-like annular member 80 surrounding the speed sensitive mechanism 82 which may take the form of spherical flyweights. Mounted on the shaft 72 is the flyweight receiving member 84 which engages the flyweight on the rear cam surface generally indicated by numeral 86 so that as the flywheels are rotated, centrifugal force urges them radially outward, and due to the reaction on the cam surface, member 84 is caused to move linearly. It will be noted that member 84 is free to move in an axial direction with respect to shaft 72. A speed sensitive actuating mechanism 88 is supported to member 84 by bearing 90 and the actuating mechanism is movable with the member 84 so that linear motion imparted by virtue of the flyweights 82 will cause the actuating mechanism 88 to move linearly therewith. Helical compression spring 92 engages the outer periphery 94 of the actuator 88, and the height of the spring 92 determines the axial force imparted on the flywheel 70. A coaxial spring 96 is secured within the acceleration mechanism so that its free end will engage a ring member which in turn is engageable with the outer periphery of the actuating mechanism 88.

It thus becomes apparent that as the speed of the turbine rotor increases, the flyweights 86 will move the actuating mechanism 88 linearly so that at a predetermined speed, for instance 740 r.p.m., the actuating member will engage the coaxial spring 96 to impose an additional force on the flywheel member 70. In this manner the acceleration device senses a new force so that the rate of acceleration, as will be more fully described hereinbelow, is programmed in a predetermined schedule. In operation, as the starter turbine speeds increase to say 740 r.p.m., the actuator 88 is in its retracted position so that a single compression spring bears on the flywheel and transmission coupling 74. At a constant speed condition, the flywheel and coupling will also be retracted. However, during acceleration of the system, the flywheel tends to lag behind the remainder of the accelerometer due to its relatively high inertia. This tendency to lag causes the flywheel to ride up on the balls 76 in the V grooves 81 and 83 imparting an axial motion to the shaft 72 which is proportional to the starting system acceleration. The free end of shaft 72 engages a valve member 100 which is urged on its seat 102 by a spring 104. Not shown in FIG. 2 but as will become apparent from the description to follow, chamber 106 communicates with the pressure regulating and shutoff valve so that unseating of the valve member 100 will bleed regulating pressure from the pressure regulating and shut-off valve and serves to reposition the metering to reduce the acceleration of the turbine so as to maintain the proper torque level. The axial motion imparted on the shaft 72, which is generated by the flywheel 70, overrides the normal pressure controlling mechanism which is doing the normal controlling. When the predetermined speed, that is 740 r.p.m., has been achieved, the speed loaded flyweights 82 move to a new radial position causing the actuator 94 to engage the additional compression spring 96. This additional spring generates an additional force which restrains the flyweight translation.

Referring for the moment to FIG. 5, line H illustrates the torque speed characteristic of the improved starter control mechanism so that as is evident from the graph, point S illustrates when the additional spring engages the actuator so as to impose a new acceleration schedule on the control mechanism. This causes the torque to reduce and by virtue of the spring forces, the torque can be made to go through point D which is the proper torque and speed requirements necessary to obtain starting of the power plant.

Figure 4:
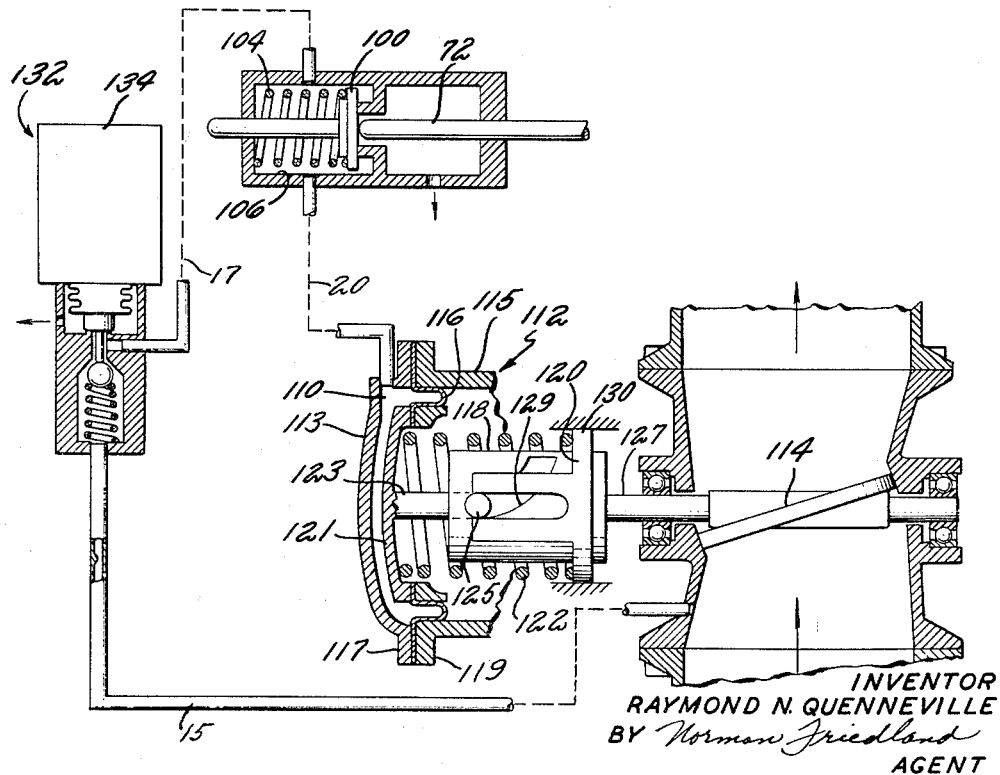
FIG. 4 is a schematic illustration partly in section showing the modified pressure control mechanism for regulating the motivating fluid which propels the starter turbine.

FIG. 4 illustrates in its preferred embodiment control mechanism for throttling the motivating fluid which propels the turbine rotor of the starter. The mechanism incorporates the means for overriding the normal control for obtaining the speed and acceleration characteristics as contemplated by this invention. As will be realized by one skilled in the art in the heretofore starter control mechanisms the manner of scheduling the speed of the turbine was to adjust the opening of the throttle valve in accordance with the pressure of the motivating fluid sensed upstream of this throttle valve. For explanation purposes the valve 100 and the associated cooperating mechanism is utilized with a well known control starter control device but it will be understood that this mechanism merely shows preferred embodiment where this invention can be carried out. Thus, it will be realized that the heretofore starter control mechanism constitutes the devices shown in FIG. 4 excluding the overriding mechanism. It further will be noted that this overriding mechanism and likewise the numerals correspond to the mechanism included in the programming accelerometer 18.

As was noted above the motivating fluid is metered to the starter by the butterfly valve 114 which is rotated by the actuator generally indicated by numeral 112. Actuator 112 serves to sense the pressure of the fluid upstream of butterfly valve 114 for regulating the opening thereof and thus controlling the amount of fluid transmitted to the starter turbine. The actuator comprises cooperating housing members 113 and 115 each carrying cooperating flanges 117 and 119 which are secured to each other in any well known manner. A moveable diaphragm 116 is secured between these flanges and carries at its free end a central member 121. The central member 121 carries an axial extending arm 123 which carries at its free end a follower member 125. The follower member rides in arcuate slots 129 provided in a cylindrical cam member 118. The cam as will be noted is affixed to one end of shaft 127 which is in turn affixed at its opposite end to butterfly valve 114. The shaft may be supported for rotary movement in bearings. Yoke member 120 is rigidly supported in any suitable manner so that the follower 125 rides in the grooves formed in the yoke. Spring 122 is supported by the yoke and has its free end engaging the diaphragm-carrying control member 121.

As will be noted from FIG. 4, casing members 113 and 115, diaphragm 116 and central member 121 define a variable volume chamber 110, which receives the fluid pressure sensed upstream of the butterfly valve 114. The fluid conducting passages 15, 17 and 20 serve to communicate chamber 110 with the fluid upstream of valve 114. Starter control mechanism generally provide shut off control devices for the immediate closure of the metering device in the event of a failure or of reaching a predetermined speed of the starter. Such a device is illustrated generally by numeral 132. The shut-off valve may comprise a solenoid 134 which holds a spring pressed ball away from its seat to normally provide uninterrupted flow to chamber 110. Upon actuating the solenoid the ball is allowed to seat so that the fluid contained in line 103 is blocked-off and the fluid contained in chamber 110 is vented to drain. This causes the actuator to move in a position to close butterfly valve 114 as will become apparent from the description to follow immediately below.

As is apparent from the foregoing as the pressure upstream of valve 114 increases the pressure in chamber 110 likewise increases. This causes chamber 110 to expand so as to move arm 123 axially. The follower moving accordingly rides in slots 120 and 129. Since the slots 120 are held stationary, cylinder member 118 rotates and in turn rotates 114. Thus, the opening of valve 114 is regulated by the pressure in chamber 110 and the spring 122 acting in valve closing direction. The mechanism immediately described above serves to produce schedules illustrated by curves F and G in FIG. 5. When immediate closure of valve 114 is desired solenoid 134 is actuated causing the fluid in chamber 110 to escape. By relieving this pressure spring 122 is allowed to move valve 114 to the closed position.

Still referring to FIGS. 1 and 4 and in accordance with this invention the fluid being sensed upstream of valve 114 is passed through programming accelerometer 18 so that the pressure in chamber 106 is substantially equal to the pressure in chamber 110. Plunger 72 responding to the rotor acceleration being sensed abuts against valve 100. A light return spring holds valve 100 on its seal. In accordance with the schedule selected and as illustrated by curve H shown in FIG. 5 the plunger causes valve 100 to unseat. This diverts flow from chamber 110 to drain so that a lesser pressure will be sensed in chamber 110. Owing to this mechanism, the normal control mechanism is overridden to give the desired speed and acceleration schedule.

From the above description, it becomes obvious therefore that the torque of the drive coupling is controlled by programming the acceleration of the turbine 32 as a function of its speed.

It is to be understood that the invention is not limited to the specific embodiment herein illustrated and described but may be used in other ways without departing from its spirit as defined by the following claims.

I claim:

1. Control apparatus comprising a rotor, means for rotating the rotor, control means for regulating the speed of the rotor, means responsive to the acceleration of said rotor, means responsive to the speed of said rotor for adjusting said acceleration responsive means, means responsive to said acceleration responsive means for further controlling said control means for scheduling the acceleration of said rotor as a function of a predetermined speed.

2. A starter comprising a rotor, means for rotating said rotor, control means for regulating the speed of said rotor, means responsive to the acceleration of said rotor for adjusting said control means, means responsive to the speed of said rotor for adjusting said acceleration responsive means, said acceleration responsive means varying said control means for scheduling the acceleration of said rotor as a function of a predetermined speed of said rotor.

3. For a starter for driving a power plant, a rotor, means for rotating said rotor, control means for regulating the speed of said rotor, means responsive to the acceleration of said rotor, means responsive to the speed of said rotor for adjusting said acceleration responsive means, said acceleration responsive means cooperating with said control means for overriding the control means for scheduling the acceleration of said rotor as a function of a predetermined speed of said rotor.

4. Control mechanism for a starter having a rotor for driving an output shaft, said control mechanism comprising means responsive to the acceleration of said rotor, means responsive to said acceleration responsive means for controlling the acceleration of said rotor, means responsive to the speed of said rotor, means responsive to said speed responsive means for scheduling the acceleration of said rotor as a function of a first predetermined value of speed of said rotor and at a second predetermined value for a predetermined value of speed of said rotor.

5. In a starter having a rotor, a housing surrounding said rotor having an inlet, a source of fluid under pressure, means connecting said inlet to said source, valve means disposed in said connecting means for regulating the flow of fluid to said inlet, means responsive to a pressure signal of said fluid for controlling said valve means for scheduling the speed of said rotor, means responsive to the acceleration of said rotor, means responsive to said acceleration responsive means for further controlling said valve means, means responsive to the speed of said rotor for controlling said acceleration responsive means for scheduling the acceleration of said rotor as a function of a predetermined speed of said rotor.

6. Means for scheduling torque of a rotating member as a function of its speed comprising a speed control device for regulating the speed of the rotating member, an inertia member, a shaft carrying said inertia member, means including a cam for transmitting torque from the rotating member to the inertia member, said cam imparting axial movement to the shaft in response to the inertia member when the acceleration reaches a predetermined value, speed responsive means, spring means opposing the inertia responsive axial movement, said speed responsive means selectively adjusting the force opposing said axial movement created by said spring means for scheduling the acceleration of said rotor as a function of a predetermined speed of said rotor, means responsive to said acceleration schedule for further controlling said speed control device.

7. Starter control mechanism for controlling the speed of a rotary output drive comprising a member having rectilinear and rotary motion, said member carrying an inertia device, a first spring acting on one end of said inertia device for opposing the rectilinear motion of said member, speed responsive means including a slidable member abutting said first spring, a second spring in coaxial relation to the first spring, said slidable member also abutting said second spring when said speed responsive means reaches a predetermined value so that the combined spring force imparts a restraining motion to said member, means responsive to said slidable member for controlling the torque of the rotary output drive.

8. In a starter comprising a housing having bearing means, a shaft supported by said bearing means, a rotor mounted on said shaft for rotational movement, a source of pressurized fluid, a turbine secured to said rotor, a passage connecting said source to said turbine, valve means disposed in said passage for regulating the flow of fluid from said source to said turbine for driving said rotor, means responsive to the pressure of said fluid upstream of said valve means, actuator means responsive to said pressure means for controlling said valve means, acceleration control means for overriding said actuator means comprising an inertia device, means for transmitting motion from said rotor to said inertia device, a first spring for imparting a force on said inertia device, means responsive to the speed of said rotor, said speed responsive means acting on one side of said first spring, a second spring, said speed responsive device acting on one side of said second spring when the speed of the rotor reaches a predetermined value.

References Cited by the Examiner

UNITED STATES PATENTS

| 1,509,695 | 9/24 | Volet | 137—48 |
| 1,944,210 | 1/34 | Bowen | 137—48 |
| 2,633,830 | 4/53 | McCourty et al. | 137—48 |
| 2,702,560 | 2/55 | Bobier | 137—48 |
| 2,761,495 | 9/56 | Greenland | 137—48 |
| 2,896,653 | 7/59 | Marlin | 137—56 |
| 2,968,951 | 1/61 | Gouthier | 73—511 |
| 2,975,794 | 3/61 | Fischer | 73—511 |

RICHARD B. WILKINSON, *Primary Examiner.*

BROUGHTON DURHAM, *Examiner.*